(12) United States Patent
Mollick et al.

(10) Patent No.: US 7,387,329 B2
(45) Date of Patent: Jun. 17, 2008

(54) VEHICLE WINDOW INTERIOR SHADE ASSEMBLY

(75) Inventors: Matthew Mollick, Novi, MI (US); Hirofumi Eta, Farmington Hills, MI (US); Mark Snyder, Beverly Hills, MI (US)

(73) Assignee: Nissan Technical Center North America, Inc. MI (US)

( * ) Notice: Subject to any disclaimer, the term of this patent is extended or adjusted under 35 U.S.C. 154(b) by 273 days.

(21) Appl. No.: 11/352,394

(22) Filed: Feb. 13, 2006

(65) Prior Publication Data

US 2007/0187977 A1    Aug. 16, 2007

(51) Int. Cl.
*B60J 3/00* (2006.01)
(52) U.S. Cl. ..................... 296/97.8; 296/138
(58) Field of Classification Search ............... 296/97.8, 296/135, 138, 142, 143, 210, 211, 215; 135/117; 160/370.21
See application file for complete search history.

(56) References Cited

U.S. PATENT DOCUMENTS

| | | |
|---|---|---|
| 5,085,473 A | 2/1992 | Yang |
| 5,101,878 A | 4/1992 | Thomas |
| 5,598,883 A | 2/1997 | Platsis |
| 5,860,466 A | 1/1999 | Kao |
| 5,884,731 A | 3/1999 | Young |
| 6,230,784 B1 | 5/2001 | Sanz et al. |
| 6,267,431 B1 | 7/2001 | Watkins |
| 6,520,569 B2 | 2/2003 | Wingen et al. |
| 6,682,133 B2 | 1/2004 | Glasl |
| 6,726,275 B2 | 4/2004 | Schrans |
| 6,805,402 B2 | 10/2004 | Pfalzgraf |
| 6,834,705 B2 | 12/2004 | Seel |
| 6,874,845 B2 | 4/2005 | Engl et al. |
| 6,899,380 B2 | 5/2005 | Kralik et al. |
| 6,957,850 B2 | 10/2005 | Breuer et al. |

*Primary Examiner*—Lori L Lyjak
(74) *Attorney, Agent, or Firm*—Global IP Counselors

(57) ABSTRACT

A vehicle window interior shade assembly includes a vehicle shade support structure, a first shade, a second shade, and a trim member. The vehicle shade support structure is configured for installation adjacent to a window opening. The first shade and second shades are movably coupled to the vehicle shade support structure to move between respective retracted positions and extended positions. The trim member is coupled to a first leading edge portion of the first shade and includes an elongated recess configured to releasably receive a second leading edge portion of the second shade to form a continuous shade structure when the first and second shades are in both in their extended positions.

23 Claims, 15 Drawing Sheets

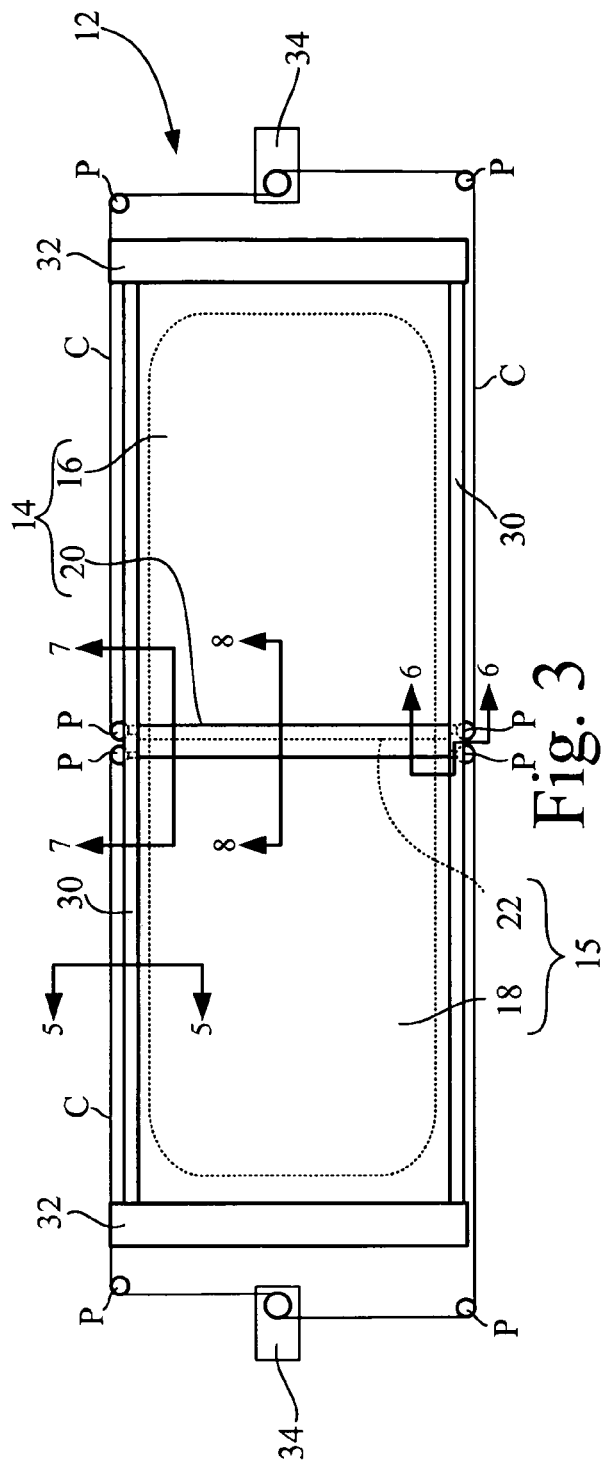
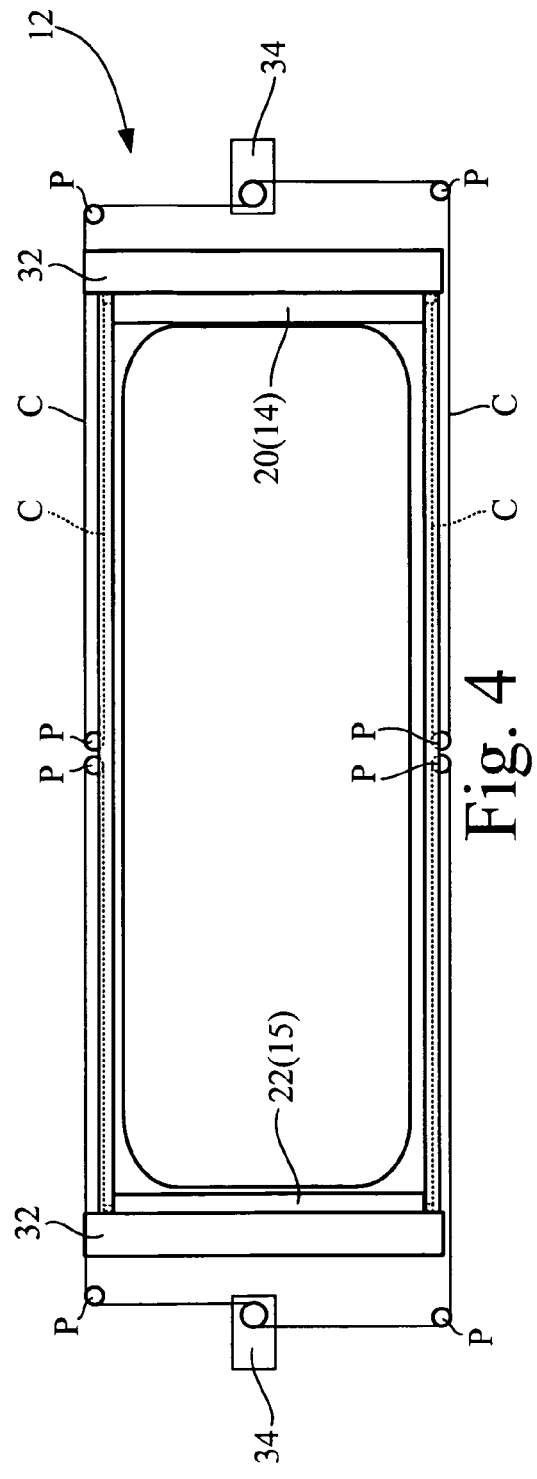
Fig. 3
Fig. 4

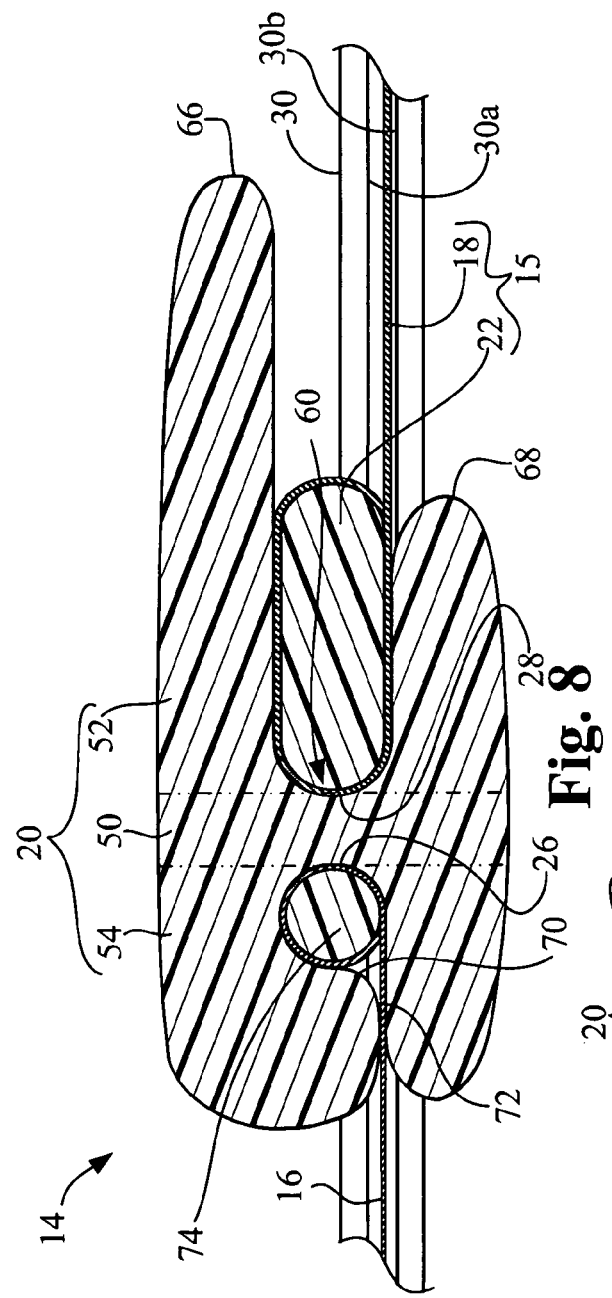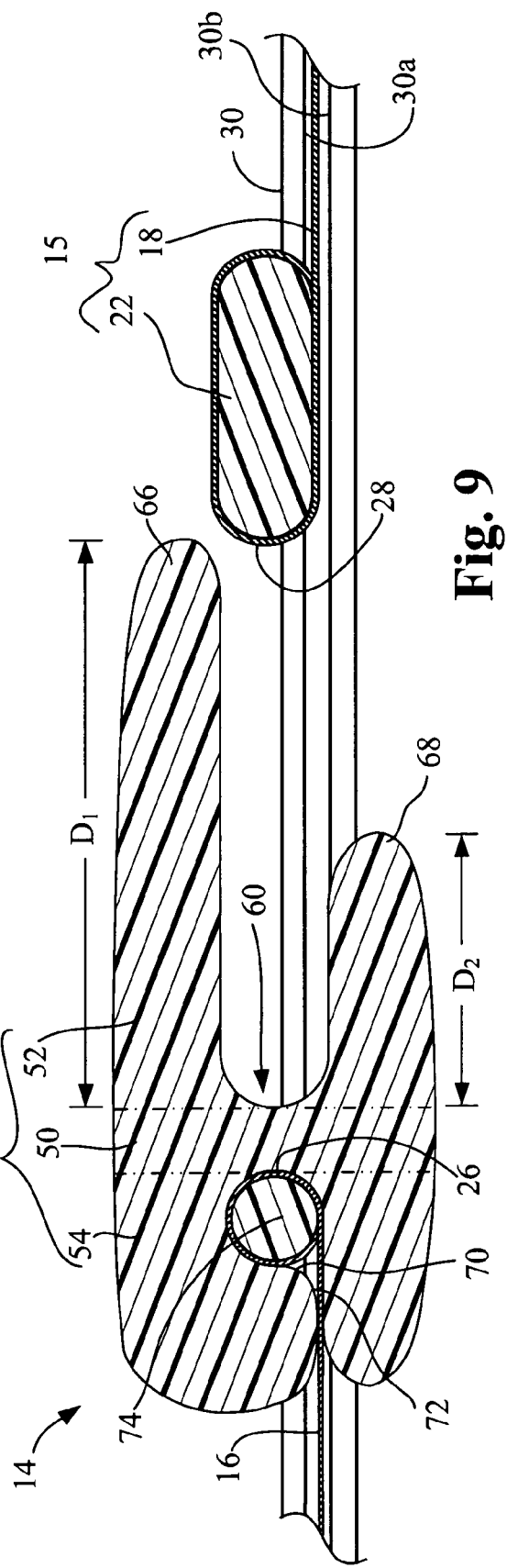

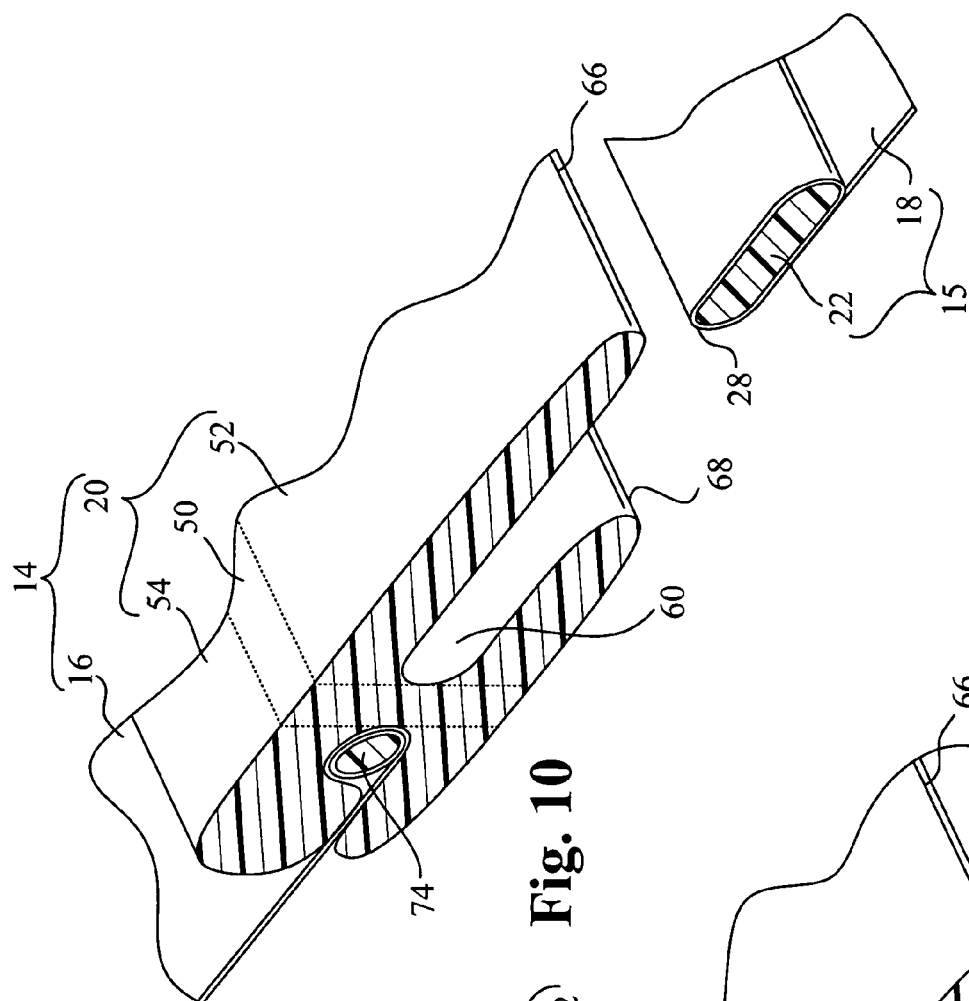
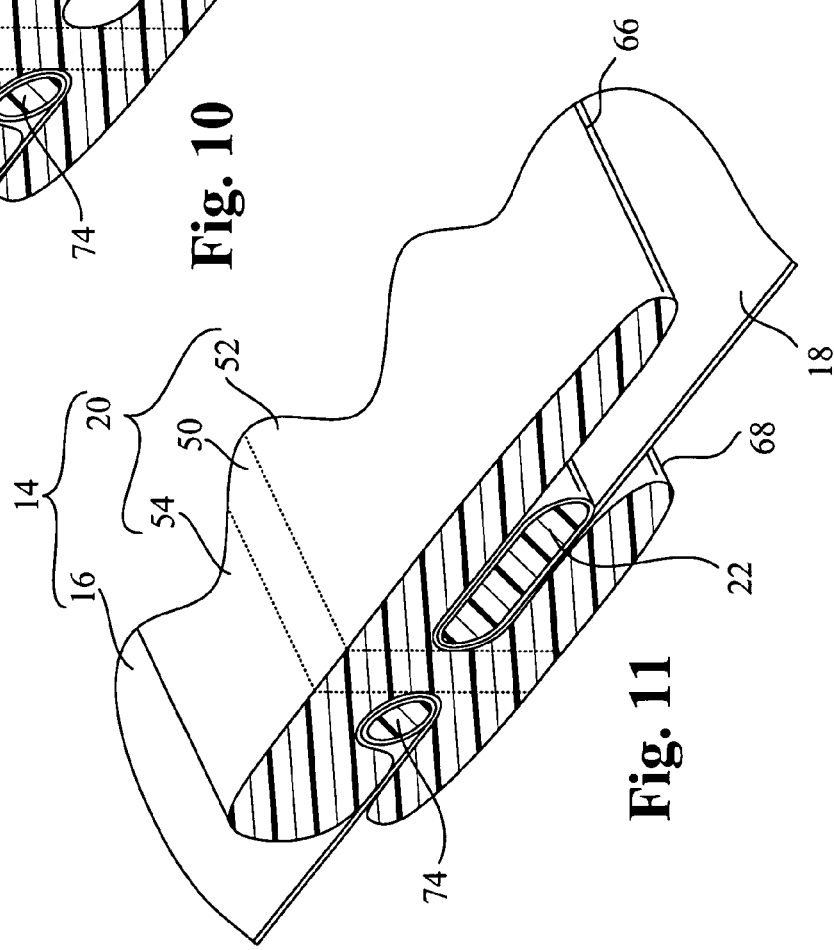

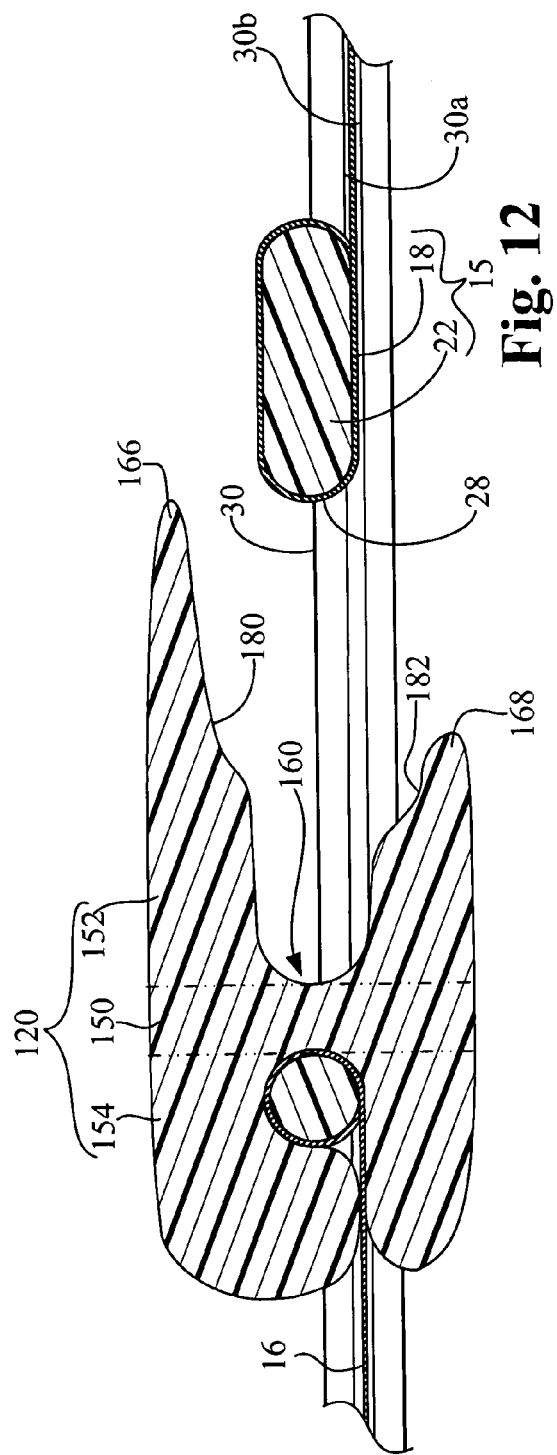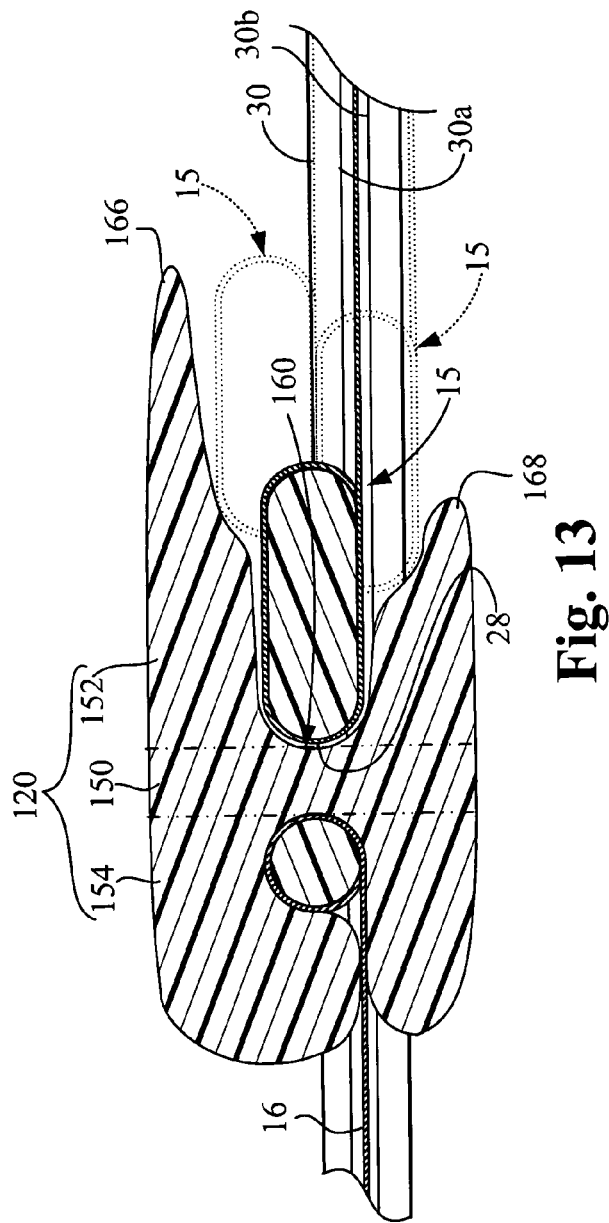

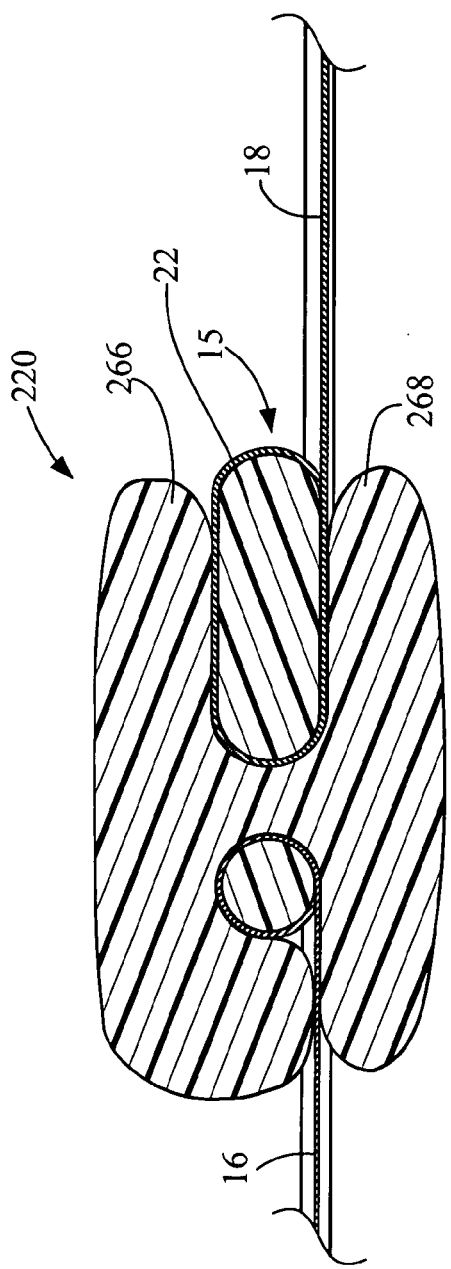
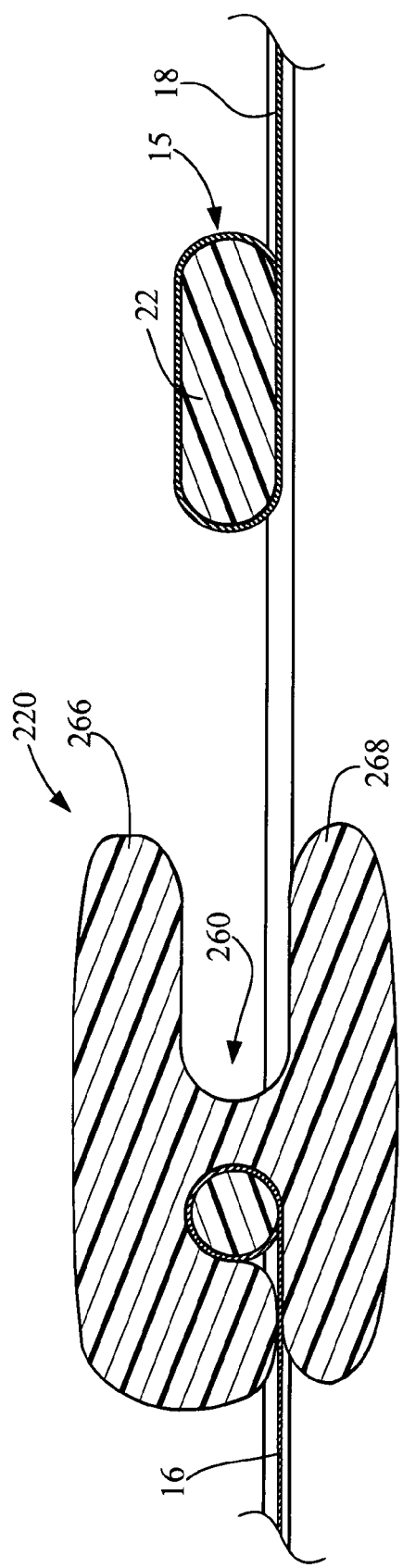
Fig. 14
Fig. 15

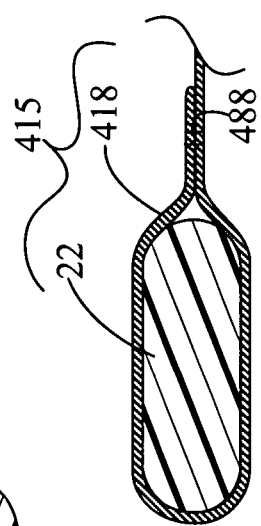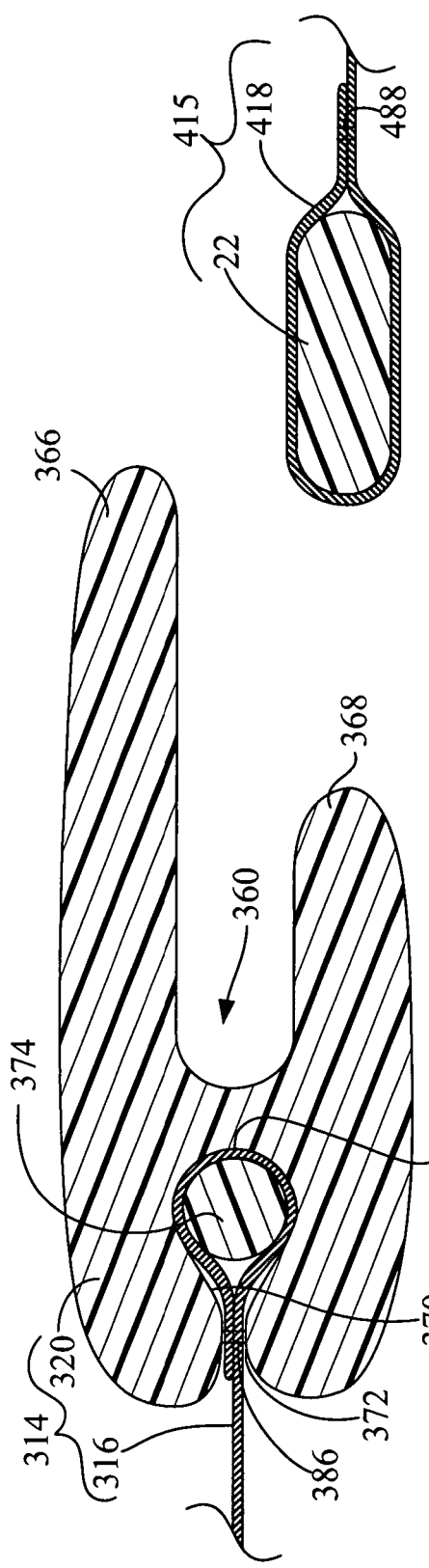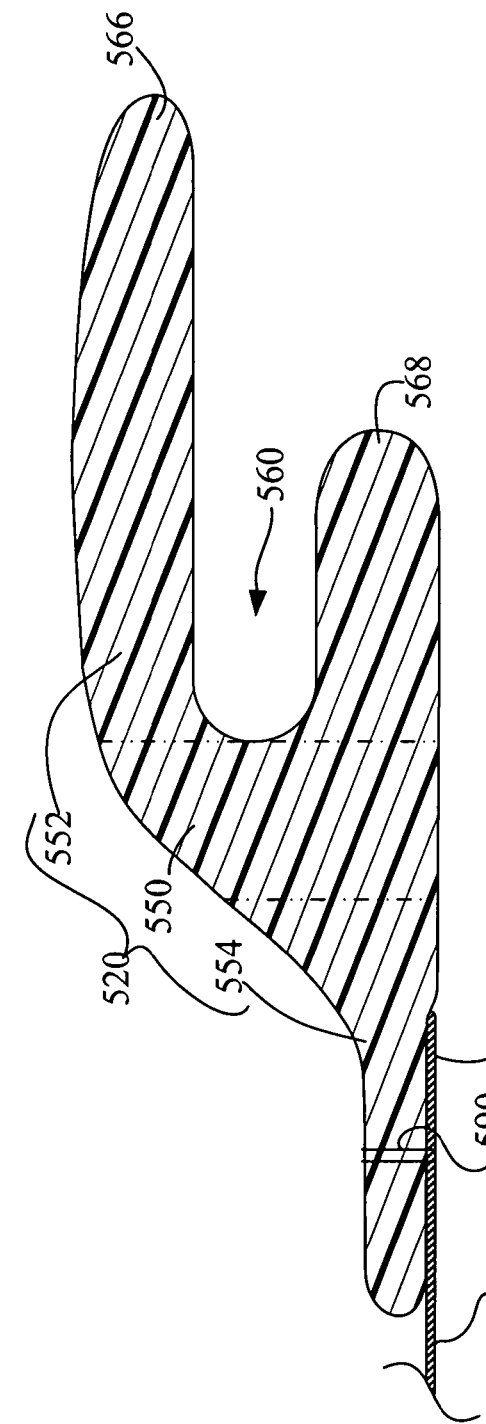

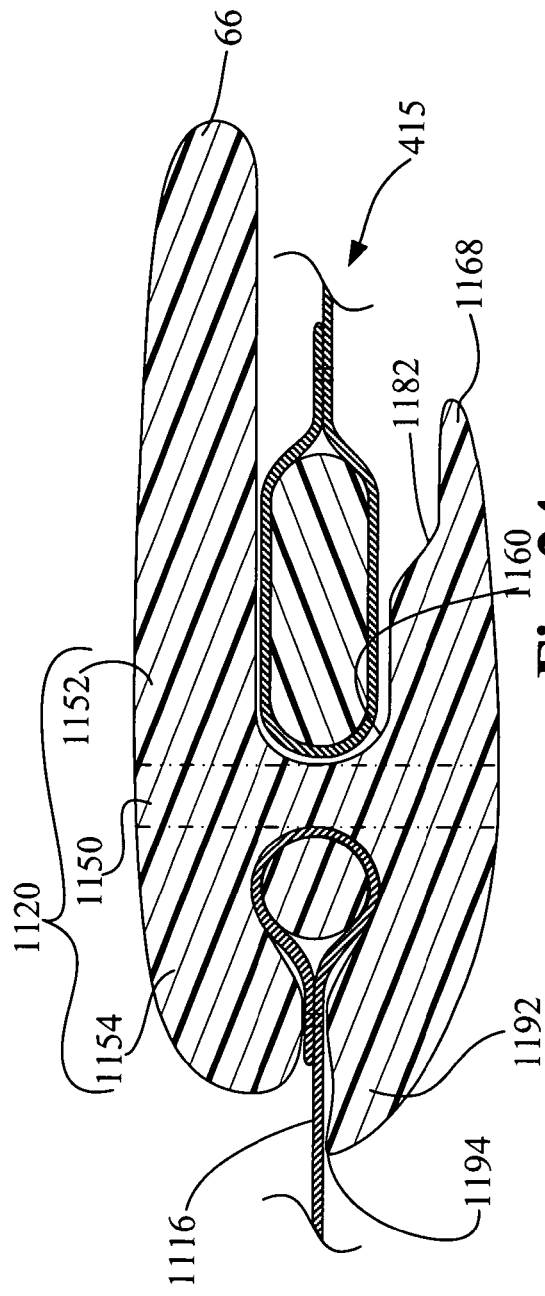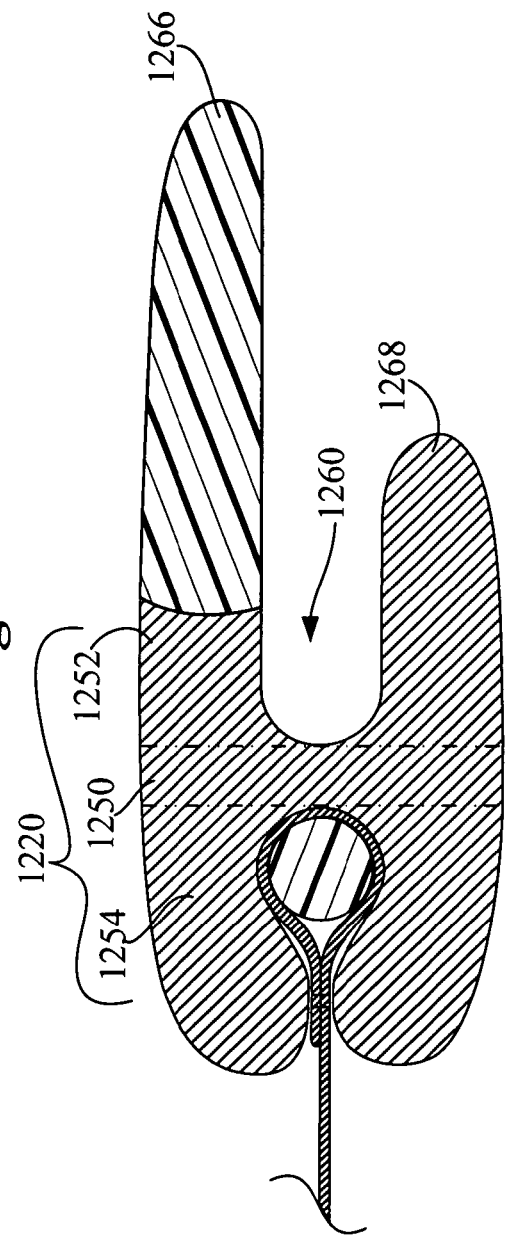

VEHICLE WINDOW INTERIOR SHADE ASSEMBLY

BACKGROUND OF THE INVENTION

1. Field of the Invention

The present invention generally relates to a vehicle window interior shade assembly. More specifically, the present invention relates to a vehicle window interior shade assembly that includes two shades moveable from opposite sides of a window that mate together at approximately a central portion of the window thereby covering the window blocking sunlight and visibility.

2. Background Information

Most vehicles are provided with windows that are for the pleasure and comfort of passengers, and not specifically for driving visibility. Such windows typically allow sunlight to stream into the vehicle whether or not the passenger desires such light. Also some vehicles, such as vans and SUVs (sports utility vehicles) are provided with sunroofs or glass panels (windows) in the roof of the vehicle. In sunroofs, a slidable rigid panel is occasionally provided in the roof structure in order to provide shade and selectively cover the sunroof to block bright sunlight. However, such rigid panels require space between a headliner and roof structure of the vehicle, or are removable and require storage space elsewhere within the vehicle. Two examples of vehicles having a sunroof with a retractable window covering are disclosed in U.S. Pat. No. 6,682,133 and U.S. Pat. No. 6,899,380. Moreover, there are many aftermarket shade assemblies that are installable on vehicle windows to selectively block the sunlight. In particular, sun shades are available for covering windshields in order to keep the vehicle cool in bright sunlight conditions and protect portions of the dashboard and seats. Some examples of such windshield covers are disclosed in U.S. Pat. No. 5,101,878, U.S. Pat. No. 5,884,731 and U.S. Pat. No. 6,267,431. However, such shade assemblies are not typically intended for use while driving the vehicle. Also some of these shade assemblies are temporarily installed units that mount on a portion of the vehicle.

In view of the above, it will be apparent to those skilled in the art from this disclosure that there exists a need for an improved shade assembly that provides shade for vehicle windows and sunroofs in order to block bright sunlight. This invention addresses this need in the art as well as other needs, which will become apparent to those skilled in the art from this disclosure.

SUMMARY OF THE INVENTION

It has been discovered that it is often desirable to use a pair of oppositely retractable shades in order to block light through a window or sunroof. It has also been discovered that it is beneficial to have portions of the two shades contacting or overlaping one another when in a closed position.

One object of the present invention is to provide a vehicle window interior shade assembly with trim members that mate with one another in order to completely block passage of light through two shades covering a single window opening.

Another object of the present invention is to provide an attractive trim member that provides strength and rigidity to a leading edge of a shade and adds to the functionality of the shade.

Accordingly, in one aspect of the present invention, a vehicle window interior shade assembly includes a vehicle shade support structure, a first shade, a second shade, and a trim member. The vehicle shade support structure is configured for installation adjacent to a window opening. The first shade and second shades are movably coupled to the vehicle shade support structure to move between respective retracted positions and extended positions. The trim member is coupled to a first leading edge portion of the first shade and includes an elongated recess configured to releasably receive a second leading edge portion of the second shade to form a continuous shade structure when the first and second shades are in both in their extended positions.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a simplified, bottom plan view of one of the vehicle window interior shade assemblies showing a pair of shades in their extended or closed positions in accordance with the first embodiment of the present invention;

FIG. 4 is a simplified, bottom plan view of the vehicle window interior shade assembly depicted in FIG. 3, showing the shades in their retracted or open positions with trim members at the leading edge of each of the shades in accordance with the first embodiment of the present invention;

FIG. 8 is a side cross-sectional view of a portion of the vehicle window interior shade assembly taken along section line 8-8 in FIG. 3, showing portions of the trim members and the shades in their closed or extended positions in accordance with the first embodiment of the present invention;

FIG. 9 is a side cross-sectional view, similar to FIG. 8, of a portion of the vehicle window interior shade assembly showing portions of the trim members and the shades in their open or retracted positions in accordance with the first embodiment of the present invention;

FIG. 10 is a perspective cross-sectional view of portions of the trim members and the shades of the vehicle window interior shade assembly with the shades in their partially open or retracted positions in accordance with the first embodiment of the present invention;

FIG. 11 is a perspective cross-sectional view, similar to FIG. 10, of portions of the trim members and the shades of the vehicle window interior shade assembly with the shades in their closed or extended positions in accordance with the first embodiment of the present invention;

FIG. 12 is a side cross-sectional view of portions of trim members and shades of the vehicle window interior shade assembly with the shades in their partially open or retracted positions in accordance with a second embodiment of the present invention;

FIG. 13 is a side cross-sectional view of portions of the trim members and the shades of the vehicle window interior shade assembly with the shades in their closed or extended positions in accordance with the second embodiment of the present invention;

FIG. 14 is a side cross-sectional view of portions of trim members and shades of the vehicle window interior shade assembly with the shades in their closed or extended positions in accordance with a third embodiment of the present invention;

FIG. 15 is a side cross-sectional view, similar to FIG. 14, of portions of the trim members and the shades of the vehicle window interior shade assembly with the shades in their partially open or partially retracted positions in accordance with the third embodiment of the present invention;

FIG. 16 is a side cross-sectional view of portions of a first trim member and a first shade of the vehicle window interior shade assembly in accordance with a fourth embodiment of the present invention;

FIG. 17 is a side cross-sectional view of portions of a second trim member and second shade of the vehicle window interior shade assembly in accordance with a fifth embodiment of the present invention;

FIG. 18 is a side cross-sectional view of portions of a first trim member and a first shade of the vehicle window interior shade assembly in accordance with a sixth embodiment of the present invention;

FIG. 24 is a side cross-sectional view of portions of first and second trim members and respective first and second shades of the vehicle window interior shade assembly in accordance with a twelfth embodiment of the present invention; and FIG. 25 is a side cross-sectional view of portions of a first trim member and a first shade of the vehicle window interior shade assembly in accordance with a thirteenth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
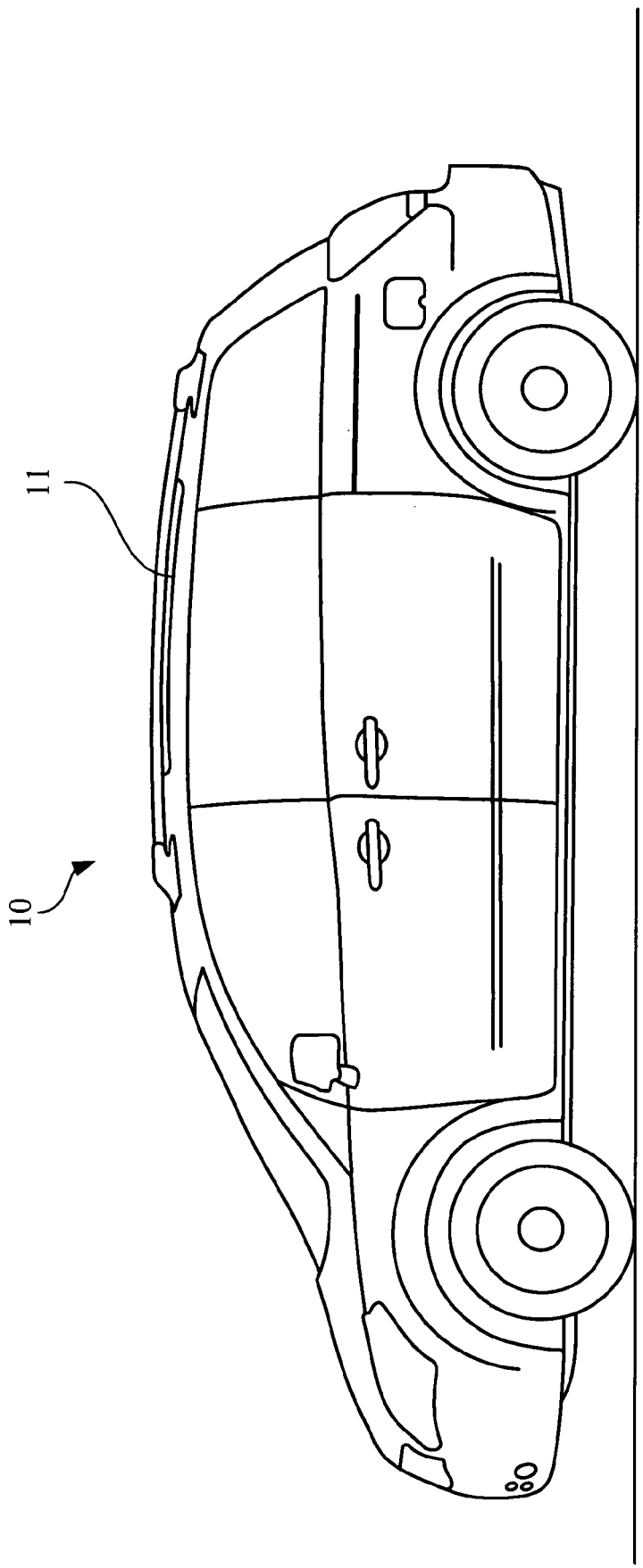
FIG. 1 is a side elevational view of a vehicle that is equipped with a vehicle window interior shade assembly in accordance with the present invention.
Figure 2:
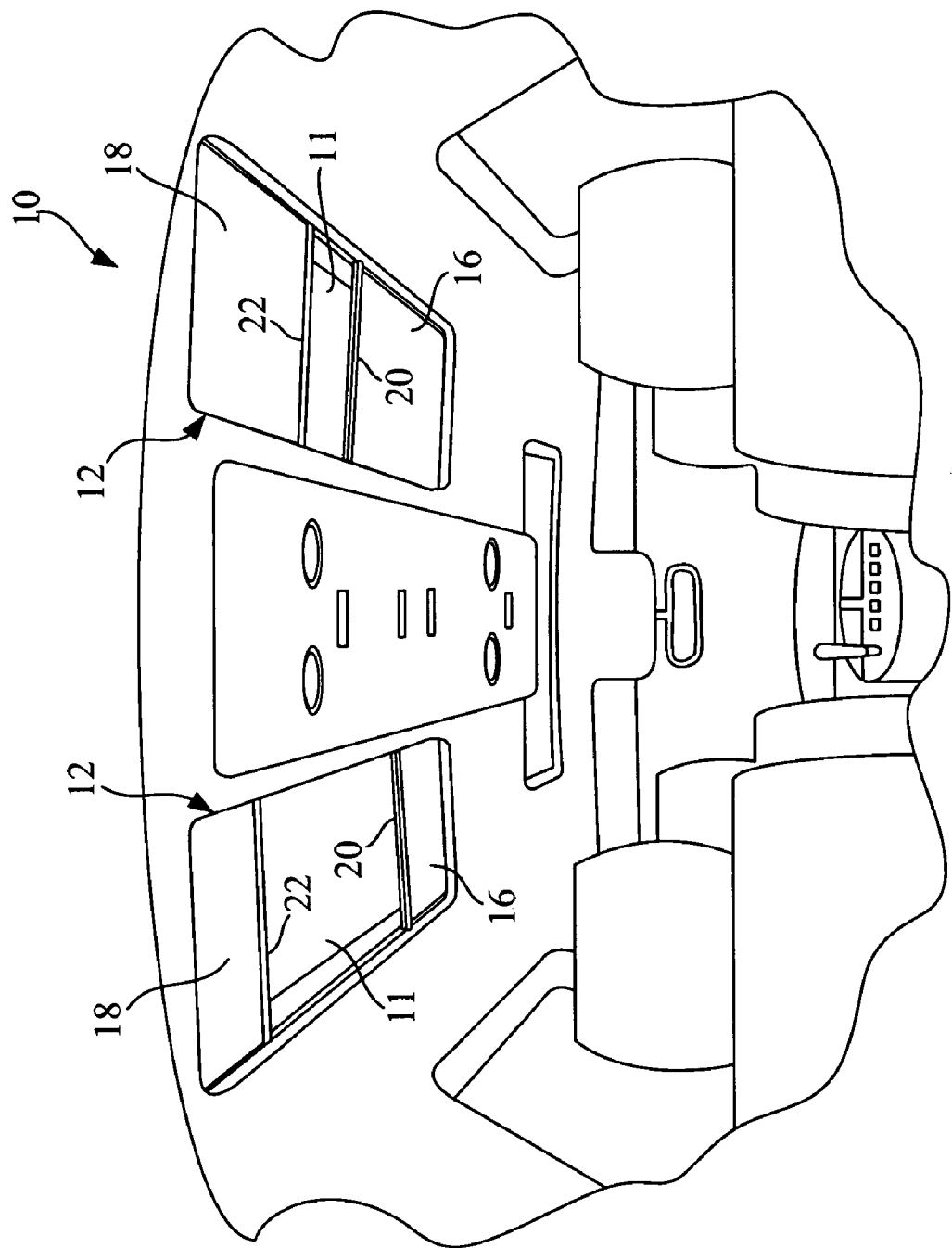
FIG. 2 is perspective view of an interior portion of the vehicle showing two vehicle window interior shade assemblies in accordance with a first embodiment of the present invention.

Referring initially to FIGS. 1 and 2, a vehicle 10 includes a pair of windows 11 and a pair of corresponding interior shade assemblies 12 (FIG. 2) illustrated in accordance with a first embodiment of the present invention. Each of the interior shade assemblies 12 is installed within the vehicle 10 adjacent to a corresponding one of the windows 11.

Each interior shade assembly 12 includes a support structure 13, a first rollup 14 and a second rollup 15. As described in greater detail below, the first and second rollups 14 and 15 are each supported by the support structure 13 to move between respective retracted or open positions and respective extended or closed positions. Further, the first and second rollups 14 and 15 are configured to interact with one another when in their respective closed positions to completely cover the window 11 thereby blocking light from shining therethrough. Specifically, each of the first and second rollups 14 and 15 includes a first shade 16, a second shade 18, a trim member 20 attached to a free end of the first shade 16 and a reinforcement member 22 attached to a free end of the second shade 18. As described in greater detail below, the trim member 20 and the reinforcement member 22 overlap or mate when the first and second rollups 14 and 15 are in their closed positions. Consequently, when in their closed positions, the first and second shades 16 and 18 together with the trim member 20 and the reinforcement member 22 of each of the first and second rollups 14 and 15 completely cover the windows 11 to block all light that would otherwise shine through the windows 11.

With specific reference to FIGS. 3 through 7, the support structure 13 of one of the interior shade assemblies 12 is now described. Since the interior shade assemblies 12 are generally the same, the description of one applies to both. In FIG. 3, interior trim portions of the vehicle 10, such as a headliner and trim components, have been removed to show details of the support structure 13 of the interior shade assembly 12. The support structure 13 includes a pair of tracks or rails 30 that extend between a pair of conventional spring loaded take-up mechanisms 32 (FIGS. 3 and 4). The first and second shades 16 and 18 are each operatively coupled to a pair of cables C that are engaged with a plurality of pulleys P and one of a pair of independently operable motors 34.

The support structure 13 supports and confines movement of the first and second rollups 14 and 15 as the first and second rollups 14 and 15 are retracted into and pulled out of the take-up mechanisms 32. Specifically, one end (not shown) of the first shade 16 of the first rollup 14 is fixed to a conventional spring loaded spindle (not shown) within one of the take-up mechanisms 32. Similarly, one end (not shown) of the second shade 18 of the second rollup 15 is fixed to a conventional spring loaded spindle (not shown) within the other of the take-up mechanisms 32. The take-up mechanisms 32 are conventional structures that are well known, and thus, will not be discussed and/or illustrated in further detail herein. The rails 30 and the take-up mechanisms 32 are configured for installation to the vehicle 10 adjacent to the window 11 in a conventional manner, such as fasteners or clips. The cables C, the pulleys P and the motors 34 generally define a control mechanism for independently operating the first and second rollups 14 and 15 such that the trim member 20 and the reinforcement member 22 of each of the first and second shades 16 and 18 move independently from their open or retracted positions (FIG. 4) to their closed or extended positions (FIG. 3).

Figure 5:
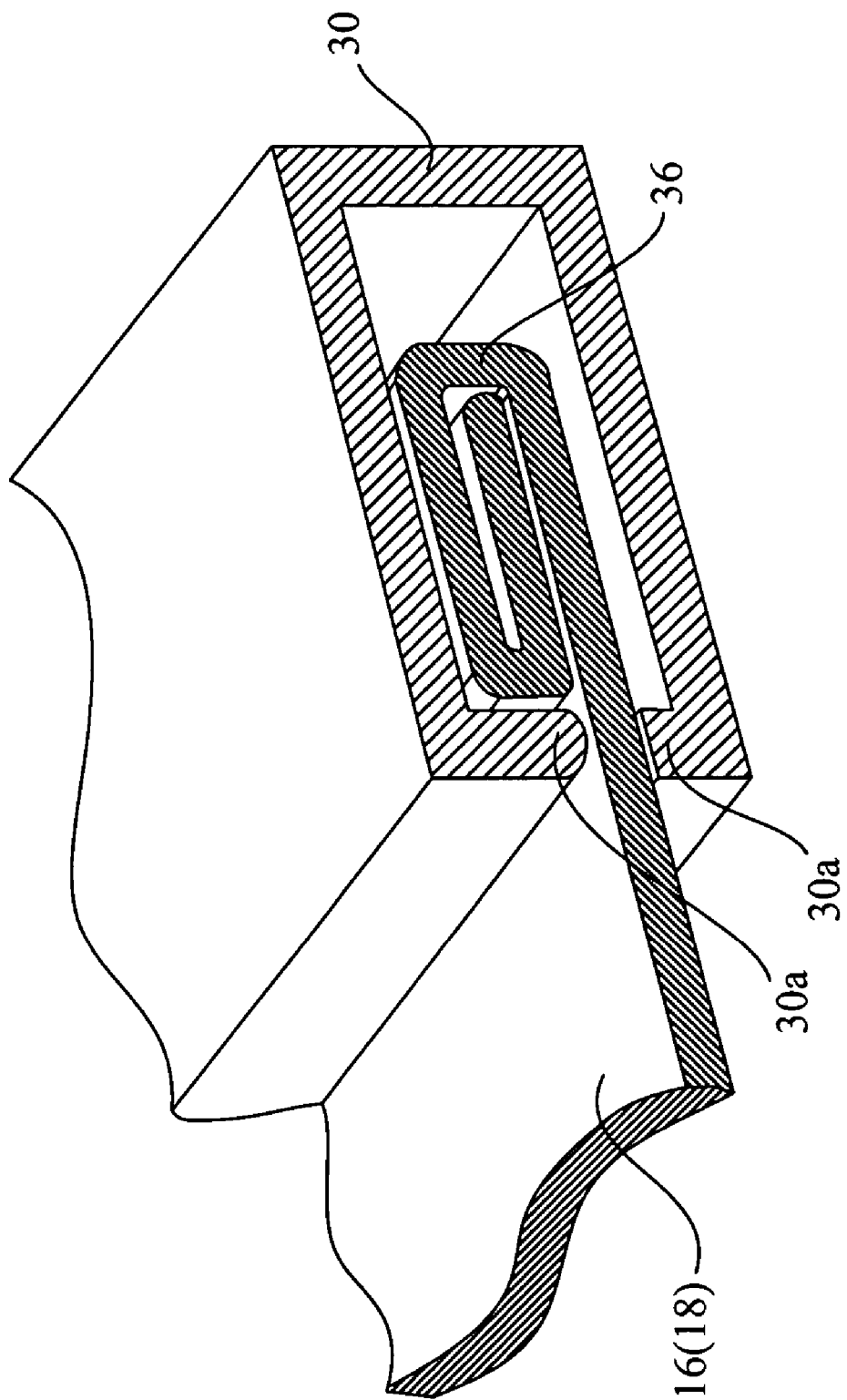
FIG. 5 is a perspective cross-sectional view of a portion of the vehicle window interior shade assembly taken along section line 5-5 in FIG. 3, showing an edge of one of the shades retained in a track in accordance with the first embodiment of the present invention.
Figure 6:
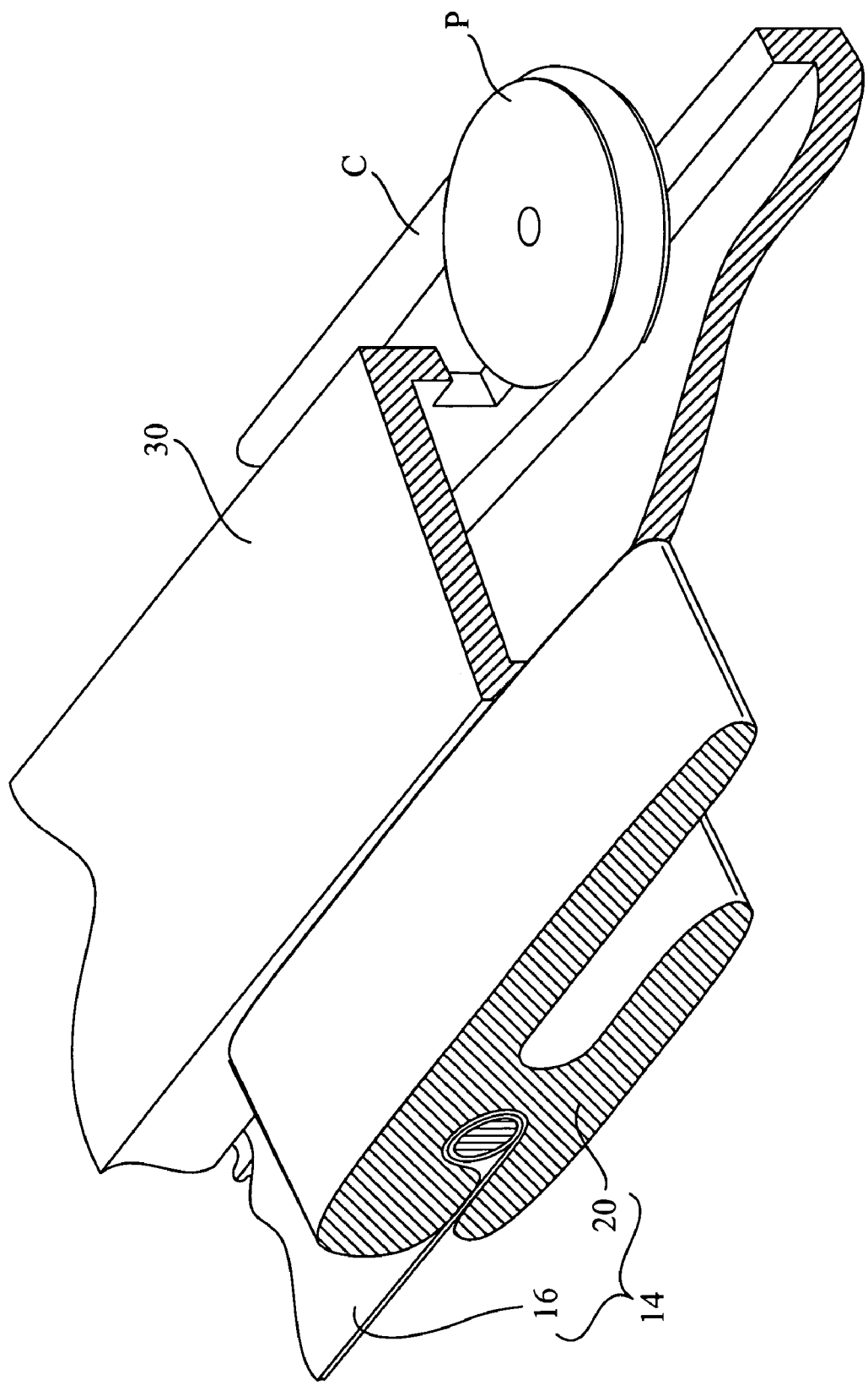
FIG. 6 is a perspective cross-sectional view of a portion of the vehicle window interior shade assembly taken along section line 6-6 in FIG. 3, showing a portion of the track, a pulley, a cable and a portion of one of the trim members in accordance with the first embodiment of the present invention.

The rails 30 are preferably made of extruded aluminum or other rigid material. The rails 30 preferably have a U-shaped cross-section, as shown in FIG. 5. The rails 30 are preferably formed with a pair of projections 30a and 30b that extend toward one another to form a narrow slot through which lateral sides of the first and second shades 16 and 18 extend, as shown in FIG. 5. As also shown in FIG. 5, the first and second shades 16 and 18 are formed with side edges 36 that are confined within the hollow interior of the rails 30. The side edges 36 are described in greater detail below with the description of the first and second rollups 14 and 15.

The take-up mechanisms 32 preferably operate as conventional shade retraction mechanisms that include the above mentioned spring biased spindle or shaft (not shown) about which the first and second shades 16 and 18 of the first and second rollups 14 and 15 are wound when in the retracted position. When pulled out of the take-up mechanisms 32 to their respective extended positions the first and second shades 16 and 18 of the first and second rollups 14 and 15 wind off the spindle or shaft as it rotates against the biasing of the spring (not shown). The biasing of the spring in each of the take-up mechanisms 32 urges the spindle or shaft to wind in a conventional manner drawing the first and second shades 16 and 18 about the spindle or shaft back into their respective one of the take-up mechanism 32.

The first and second rollups 14 and 15 are drawn to their extended or closed positions by respective ones of the motors 34 and corresponding ones of the cables C in the first embodiment. The cables C extend around corresponding pulleys P and connect to respective ends of the trim member 20 and the reinforcement member 22. Connections of the cables C to the trim member 20 and the reinforcement member 22 are described in greater detail below in the description of the trim member 20 and reinforcement member 22. The spring biasing arrangements in the take-up mechanisms 32 cause the first and second shades 16 and 18 of the first and second rollups 14 and 15 to retract when tension on the cables C is released by the motor 34 in a conventional manner.

It should be understood from the drawings and description herein, that the support structure 13 of the interior shade assembly 12 can have any of a variety of configurations. For example, in the depicted embodiment, two motors 34 control opening and closing (retracting and extending) of the first and second rollups 14 and 15. Specifically, one of the motors 34 controls the extending and retracting movement of the first rollup 14 and the other of the motors 34 independently controls the extending and retracting movement of the second rollup 15. Alternatively, a single motor 34 can used to control synchronous opening and closing of the first and second rollups 14 and 15. Further, in yet another configuration, the motor(s) 34, the pulleys P and the cables C can be eliminated and the first and second rollups 14 and 15 can be manually extended and retracted. In manually operated configuration, the spring biasing of the take-up mechanisms 32 is sufficient to draw the first and second shades 16 and 18 of the first and second rollups 14 and 15 onto the take-up mechanisms 32, but only when the first and second shades 16 and 18 are manually moved to the open or retracted positions.

The first and second rollups 14 and 15 are now described in greater detail below with specific reference to FIGS. 3-11. As mentioned above, the first rollup 14 basically includes the first shade 16 and the trim member 20. The first shade 16 and the trim member 20 are configured to move between the open position (retracted position) shown in FIG. 4 and the closed position (extended position) shown in FIG. 3 such that in the closed position the first shade 16 and the trim member 20 at least partially cover the corresponding window 11.

As mentioned above, the second rollup 15 basically includes the second shade 18 and the reinforcement member 22. The second rollup 15 is also configured to move between the open position (FIG. 4) and the closed position (FIG. 3) such that in the closed position the second shade 18 and the reinforcement member 22 cover the remaining portion of the window 11. With both the first and second rollups 14 and 15 in the closed position, the window 11 is completely covered.

The first and second shades 16 and 18 are preferably made at least partially of a flat, flexible sheet-like material, such as textile or fabric, canvas, plastic or similar polymer material. The first and second shades 16 and 18 can be a single material or may be laminated materials. The first and second shades 16 and 18 include the side edges 36 (shown in FIG. 5) and respective leading end portions 26 and 28 (shown in FIGS. 8 and 9). The side edges 36 extend along the opposite sides of both the first and second shades 16 and 18. The side edges 36 are modified to have a thickness that is at least twice the thickness or more of the remainder of each of the first and second shades 16 and 18. For instance, as shown in FIG. 5, the side edges 36 include a series of folds sewn or bonded together. The side edges 36 have a thickness that is greater than the gap defined between the projections 30a and 30b of the rails 30. Consequently, the side edges 36 are confined within the rails 30 and the first and second shades 16 and 18 are maintained in a smooth, non-sagging condition between the rails 30. The respective leading end portions 26 and 28 (leading edges) of the first and second shades 16 and 18 are leading edges thereof and are coupled or otherwise fixed to the trim member 20 and reinforcement member 22 in a manner described in greater detail below.

With specific reference to FIGS. 8-11, the trim member 20 is described in more detail. In the first embodiment, the trim member 20 is unitarily formed of a single material, such as a plastic or polymer material. The trim member 20 basically includes a support portion 50, a guide portion 52, an attachment portion 54 and a pair of side end projections 56 (see FIG. 7). As indicated in FIGS. 8 and 9, the support portion 50, the guide portion 52, and the attachment portion 54 are loosely defined by the vertical dashed lines as viewed in cross-section. However, it should be understood from the description below and the drawings that the dashed line divisions of the support portion 50, the guide portion 52, and the attachment portion 54 are merely general indications of the various portions of the trim member 20, and are not fixed, or inflexible boundaries.

The support portion 50 is preferably formed of a generally rigid or stiff material. The support portion 50 extends at least a width of the first shade 16 and further extends between the rails 30, as indicated in FIG. 3. The support portion 50 is dimensioned and configured to provide rigidity to the trim member 20 along the width of the first shade 16. Specifically, the height of the support portion 50 is preferably such that the trim member 20 remains straight, even with minor amounts of stress applied, for instance, when a passenger grabs and pulls on the trim member 20. Upper and lower surfaces of the support portion 50 are preferably provided with a curved or contoured shape in order to provide an aesthetically pleasing appearance.

The guide portion 52 basically includes an elongated recess 60 configured to releasably receive the leading end portion 28 of the second shade 18 to form a continuous shading cover when the first and second shades are in both in their extended positions (FIG. 3). The recess 60 is defined by a pair of guide lips 66 and 68 to guide the leading end portion 28 of the second shade 18 into the recess 60. The guide lips 66 and 68 extend from side to side between the rails 30 and the support portion 50 in a direction substantially parallel to the recess 60. As shown in FIG. 9, the guide lip 66 extends away from the recess 60 in a direction away from the leading end portion 26 of the first shade 16 a first distance $D_1$. The guide lip 68 extends away from the recess 60 in a direction away from the leading end portion 26 of the first shade 16 a second distance $D_2$. As shown in FIG. 9, the first distance $D_1$ is greater than the second distance $D_2$. The guide lips 66 and 68 guide the leading end portion 28 of the second shade 18 into the recess 60 as the first and second shades 16 and 18 and the trim member 20 and the reinforcement member 22 are moved to their extended or closed positions. Preferably, the free edges of the guide lips 66 and 68 are curved or otherwise tapered so that the recess 60 widens at the free edges of the guide lips 66 and 68.

The attachment portion 54 is defined on a side of the trim member 20 opposite from the guide portion 52. The attachment portion 54 basically includes an attachment groove 70. The attachment groove 70 preferably has cylindrical shape that extends lengthwise through the trim member 20 and a narrow slit 72 that extends lengthwise along the trim member 20. The first shade 16 extends through the narrow slit 72.

A retainer bar 74 is disposed within the cylindrically shaped attachment groove 70. The retainer bar 74 can be made of a plastic material, polymer material, metal material or any other suitable material for retaining the first shade 16 within the attachment portion 54 of the trim member 20. Further, the leading end portion 26 of the first shade 16 extends at least partially around the retainer bar 74. The first shade 16 is fixed within the attachment groove 70 of the attachment portion 54 of the trim member 20 by any of a variety of ways. For example, the leading end portion 26 of the first shade 16 can be wrapped around the retainer bar 74 and the retainer bar 74 can be force fitted within the attachment groove 70. In other words, friction retains the first shade 16 in the attachment groove 70 of the attachment portion 54 of the trim member 20. Alternatively, the leading end portion 26 of the first shade 16 can be fixed by adhesives to the retainer bar 74. Further, leading end portion 26 of the first shade 16 can be stapled or otherwise fixedly attached to the retainer bar 74.

Figure 7:
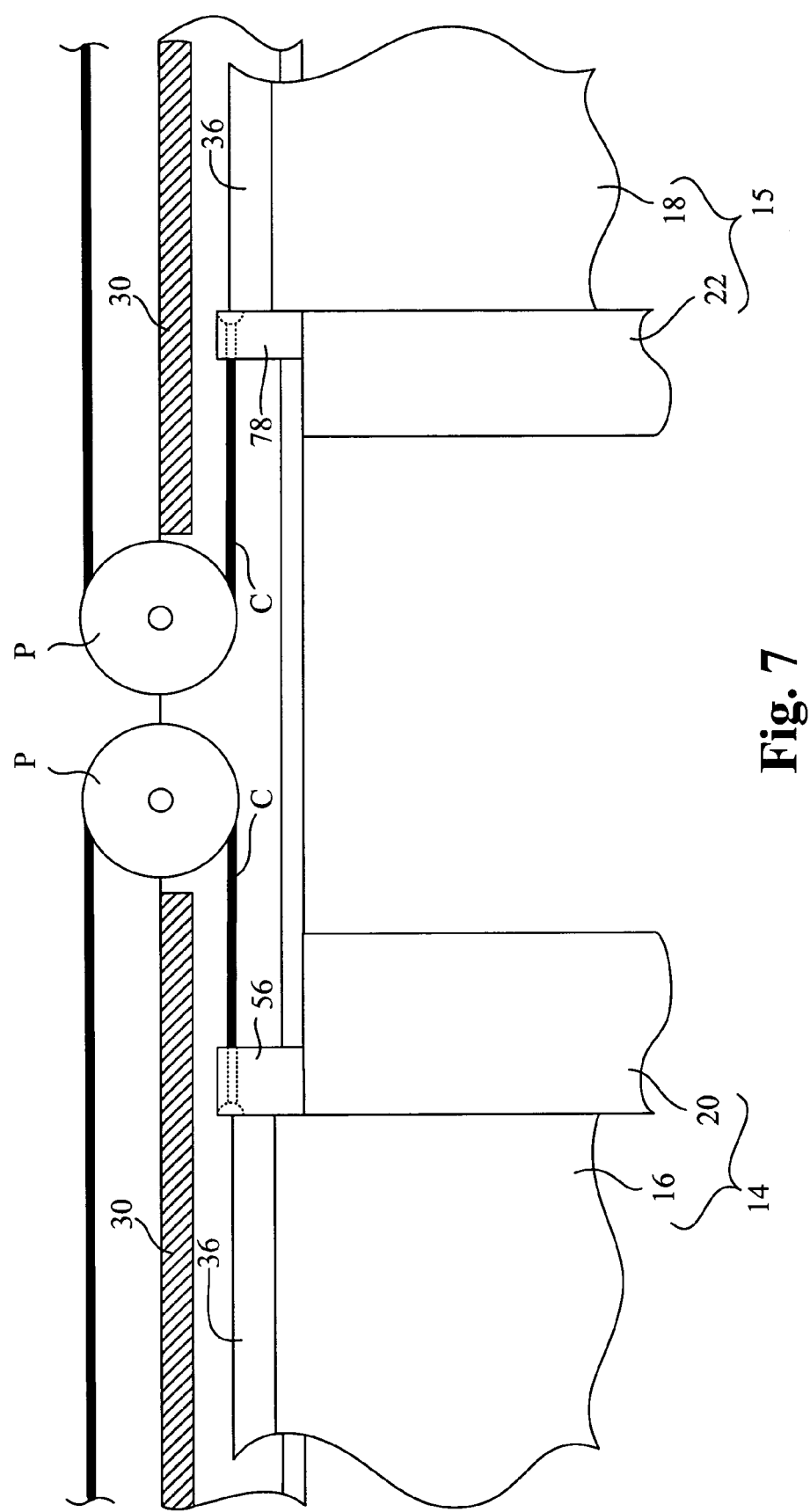
FIG. 7 is a top cross-sectional plan view of a portion of the vehicle window interior shade assembly taken along section line 7-7 in FIG. 3, showing another portion of the track, one of the pulleys, the cable and portions of the trim members in accordance with the first embodiment of the present invention.

As shown in FIG. 7, the trim member 20 is provided with side end projections 56. The side end projections 56 extend between the projections 30a and 30b and into the hollow interior of the rails 30. The side end projections 56 include an aperture that receives the end of the cable C. However, it should be understood from the drawings and description herein that the cable C can be fixed by any of a variety of methods to the side end projection 56. For example, a fastener and/or clamp arrangement can be used.

With reference to FIGS. 8-11, the second rollup 15 will now described in greater detail. As mentioned above, the second rollup 15 basically includes the second shade 18 and the reinforcement member 22. The reinforcement member 22 is also a trim member that has a complementary mating configuration to mate with the recess 60 of the trim member 20.

The leading end portion 28 of the second shade 18 is at least partially wrapped around the reinforcement member 22. The leading end portion 28 of the second shade 18 can be fixed by adhesives to reinforcement member 22. Alternatively, the leading end portion 28 of the second shade 18 can be stapled or otherwise fixedly attached to the retainer bar 74.

The reinforcement member 22 is preferably made of a plastic or polymer material, but can alternatively be made of a metal material. The reinforcement member 22 is dimensioned to easily slide in and out of the recess 60 of the guide portion 52 of the trim member 20. Specifically, the reinforcement member 22 is dimensioned to have the same height or slightly smaller than the height of the recess 60. Each lateral end of the reinforcement member 22 includes side end projections 78, as shown in FIG. 7. The side end projections 78 include an aperture that receives the end of the cable C. However, it should be understood from the drawings and description herein that the cable C can be fixed by any of a variety of methods to the side end projection 78. For example, a fastener and/or clamp arrangement can be used.

Second Embodiment

Referring now to FIGS. 12 and 13, a trim member 120 is attached to the first shade 16 in accordance with a second embodiment. Specifically, the trim member 120 replaces the trim member 20 of the first embodiment. In view of the similarity between the first and second embodiments, the descriptions of the parts of the second embodiment that are identical to the parts of the first embodiment may be omitted for the sake of brevity.

The trim member 120 includes a support portion 150, a guide portion 152 and an attachment portion 154. The support portion 150 and the attachment portion 154 are generally the same as in the first embodiment. For instance, the attachment portion 154 is configured to retain the first shade 16 as in the first embodiment, and the guide portion 152 has a recess 160 that mates with the leading end portion 28 of the second shade 18 and the reinforcement member 22. Further, the trim member 120 and the first shade 16 are supported for movement along the rail 30, as in the first embodiment.

However, the guide portion 152 is configured differently from the first embodiment. Specifically, the guide portion 152 includes a pair of guide lips 166 and 168 either side of the recess 160 to guide the leading end portion 28 of the second shade 18 into the recess 160. The guide lips 166 and 168 are formed with diverging surfaces 180 and 182 that diverge in a direction extending away from the recess 160. The surface 180 is concaved relative to the lip 166 and the surface 182 is concaved relative to the lip 168. However, it should be understood from the drawings and description that the surfaces 180 and 182 can diverge and yet be flat or slightly convex. The purpose of the surfaces 180 and 182 is to help guide the reinforcement member 22 attached to the second shade 18 of the second rollup 15 into the recess 160.

With the diverging shape of the surfaces 180 and 182, any misalignment or off-centered positioning of the second rollup 15 with respect to the recess 160 is easily corrected, as indicated in phantom in FIG. 12.

Third Embodiment

Referring now to FIGS. 14 and 15, a trim member 220 is attached to the first shade 16 in accordance with a third embodiment. Specifically, the trim member 220 replaces the trim member 20 of the first embodiment. In view of the similarity between the first and third embodiments, the descriptions of the parts of the third embodiment that are identical to the parts of the first embodiment may be omitted for the sake of brevity.

The trim member 220 is generally the same as the trim member 20 of the first embodiment, except that the trim member 220 includes a recess 260 defined by a pair lips 266 and 268 having generally the same length with respect to the recess 260.

Fourth Embodiment

Referring now to FIG. 16, a modified first rollup 314 having a modified shade 316 and a modified trim member 320 in accordance with a fourth embodiment will now be explained. Basically, the modified first rollup 314 replaces the first rollup 14 shown in FIGS. 2-11 of the interior shade assembly 12. Thus, the trim member 320 mates with the second rollup 15 and with the leading end portion 28 of the second shade 18. In view of the similarity between the first and fourth embodiments, the descriptions of the parts of the fourth embodiment that are identical to the parts of the first embodiment may be omitted for the sake of brevity.

The first shade 316 is generally the same as the first shade 16 of the first embodiment, except that the first shade 316 wraps around a retainer bar 374 and is fixed to itself. The trim member 320 has a recess 360 defined by a pair of guide lips 166 and 168 similar to the trim member 20 of the first embodiment. Thus, the trim member 320 is generally the same as the trim member 20 of the first embodiment, except that the trim member 320 has an attachment groove 370 and a narrow slit 372 that is more centrally located relative to the recess 360. Further, a leading end portion 326 of the first shade 316 wraps around the retainer bar 374 to form a loop with the main body of the first shade 316 being aligned with the center of the recess 360. The first shade 316 is fixed to itself by a fixing part 386. The fixing part 386 can be a sewn or stitched seam or can be a staple or series of staples sufficient to reinforce the loop of the first shade 316.

Fifth Embodiment

Referring now to FIG. 17, a modified second rollup 415 having a modified shade 418 in accordance with a fifth embodiment will now be explained. Basically, the modified second rollup 415 replaces the second rollup 15 shown in FIGS. 2-11 of the interior shade assembly 12. In view of the similarity between the first and fifth embodiments, the descriptions of the parts of the fifth embodiment that are identical to the parts of the first embodiment may be omitted for the sake of brevity.

In the fifth embodiment, the second rollup 415 wraps around the reinforcement member 22 and is fixed to itself. In other words, a leading end portion 428 of the second shade 418 wraps around the reinforcement member 22 to form a loop. The second shade 418 is fixed to itself by a fixing part 88. The fixing part 88 can be any of a variety of attachment configurations. The fixing part 88 can be a sewn or stitched seam or can be a staple or series of staples sufficient to reinforce the loop of the second shade 418.

Sixth Embodiment

Referring now to FIG. 18, a modified trim member 520 having a modified support portion 550, a modified guide portion 552 and a modified attachment portion 554 in accordance with a sixth embodiment will now be explained. The trim member 520 replaces the trim member 20 of the first embodiment. The trim member 520 has a recess 560 defined by a pair of guide lips 566 and 568 similar to the trim member 20 of the first embodiment. In view of the similarity between the first and sixth embodiments, the descriptions of the parts of the sixth embodiment that are identical to the parts of the first embodiment may be omitted for the sake of brevity.

The support portion 550 and the guide portion 552 of the trim member 520 are functionally the same as in the first embodiment but have a slightly different shape compared to the trim member 520 of the first embodiment. In the sixth embodiment, the attachment portion 554 is an elongated projection that extends from the support portion 550. A leading end portion 526 of a first shade 516 is fixedly attached to the attachment portion 554 by a fixing part 590. The fixing part 590 can be any of a variety of attachment configurations. For example, the fixing part 590 can be a sewn or stitched seam, a staple or series of staples or rivets sufficient to fixedly attach the first shade 516 to the attachment portion 554. Specifically, the leading end portion 526 of the first shade 516 is stapled or riveted to the attachment portion 554 or the leading end portion 526 of the first shade is sewn to the attachment portion 554.

Seventh Embodiment

Figure 19:
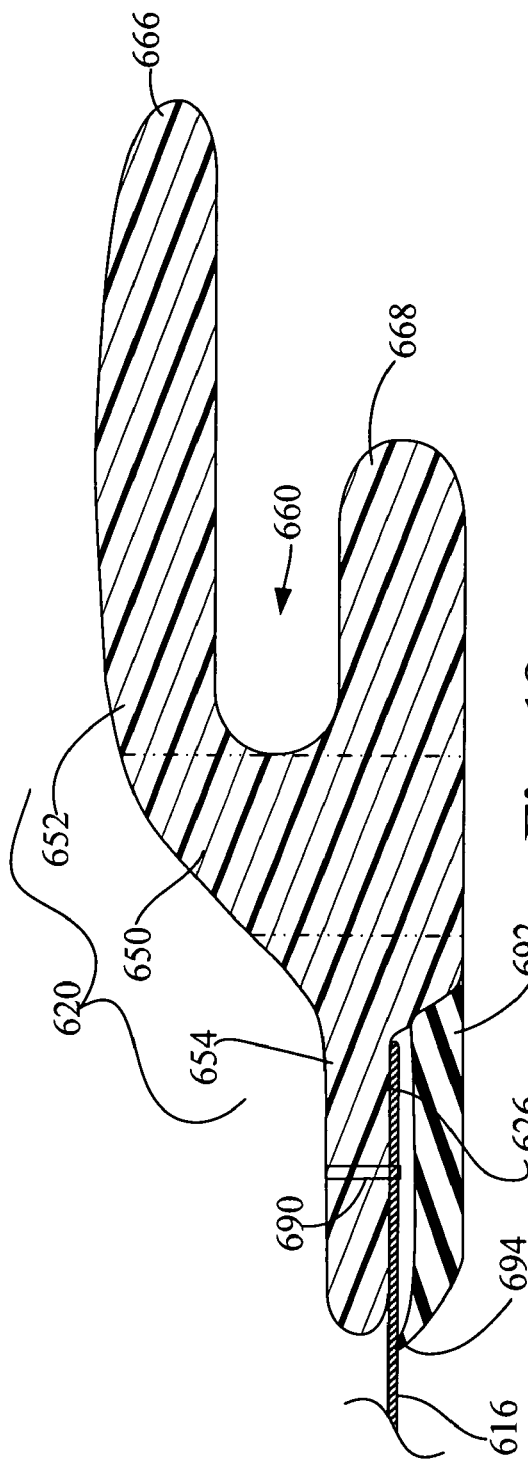
FIG. 19 is a side cross-sectional view of portions of a first trim member and a first shade of the vehicle window interior shade assembly in accordance with a seventh embodiment of the present invention.

Referring now to FIG. 19, a modified trim member 620 having a modified support portion 650, a modified guide portion 652 and a modified attachment portion 654 in accordance with a seventh embodiment will now be explained. The trim member 620 has a recess 660 defined by a pair of guide lips 666 and 668 similar to the trim member 20 of the first embodiment. Specifically, the trim member 620 replaces the trim member 20 of the first embodiment. In view of the similarity between the first and seventh embodiments, the descriptions of the parts of the seventh embodiment that are identical to the parts of the first embodiment may be omitted for the sake of brevity.

The trim member 620 includes the support portion 650, the guide portion 652 and the attachment portion 654. The support portion 650 and the guide portion 652 are functionally generally the as the support portions 50 and 550, and the guide portions 52 and 552 in the first and sixth embodiments. However, in the seventh embodiment, the attachment portion 654 includes an elongated projection that extends from the support portion 650 in a manner similar to the attachment portion 554 of the sixth embodiment. Hence, the attachment portion 654 defines a first attachment projection. Further, the leading end portion 626 of a first shade 616 is fixedly attached to the attachment portion 654 by a fixing part 690. As with the fixing part 590 in the sixth embodiment, the fixing part 690 can be any of the variety of attachment configurations described above in the sixth embodiment.

In the seventh embodiment, the attachment portion 654 also includes a second attachment projection 692. The second attachment projection 692 extends generally parallel to the attachment portion 654 (the first attachment projection). However, the second attachment projection 692 is formed with a protruding lip 694 that is biased to contact a portion of the first shade 616. The attachment projection 654 is preferably made of a rubber, rubber-like material or a material that exhibits the flexibility of a rubber material.

Eighth Embodiment

Figure 20:
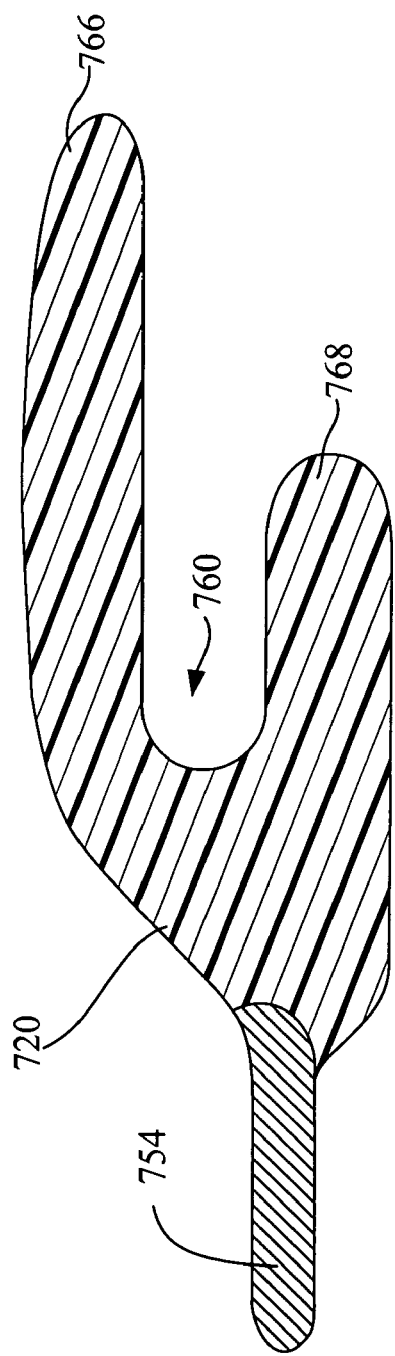
FIG. 20 is a side cross-sectional view of portions of a first trim member of the vehicle window interior shade assembly in accordance with an eighth embodiment of the present invention.

Referring now to FIG. 20, a modified trim member 720 having a modified attachment portion 754 in accordance with an eighth embodiment will now be explained. The trim member 720 has a recess 760 defined by a pair of guide lips 766 and 768 similar to the trim member 20 of the first embodiment. Specifically, the trim member 720 replaces the trim member 20 of the first embodiment. In view of the similarity between the first and eighth embodiments, the descriptions of the parts of the eighth embodiment that are identical to the parts of the first embodiment may be omitted for the sake of brevity.

The attachment portion 754 of the trim member 720 includes an attachment projection. The trim member 720 is formed of a first material and the attachment portion 754 is formed of a second material. The first material is more flexible than the second material. For example, the trim member 720 is formed of a plastic or polymer material and the attachment portion 754 is formed of a metallic material.

Ninth Embodiment

Figure 21:
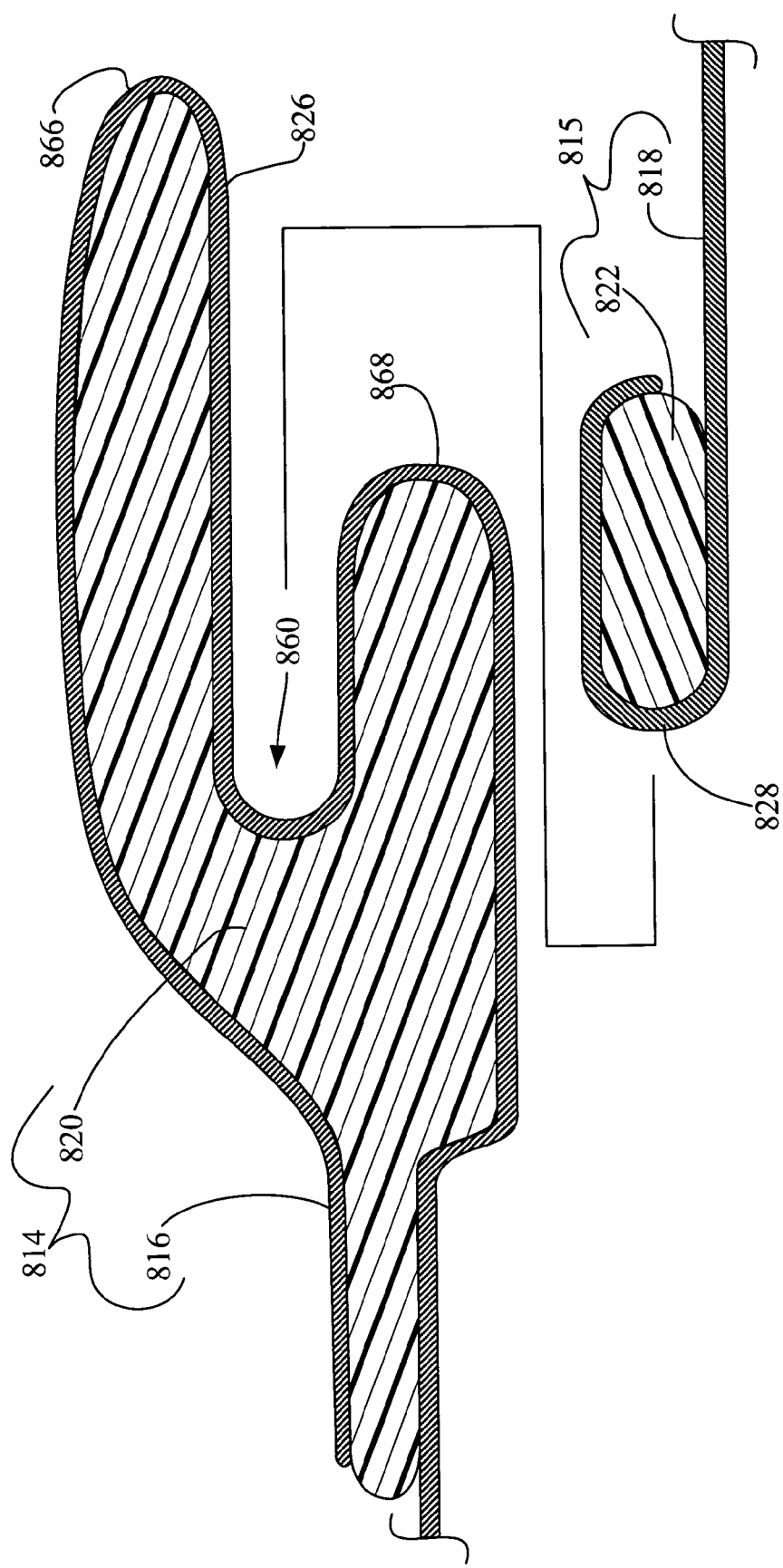
FIG. 21 is a side cross-sectional view of portions of first and second trim members and respective first and second shades of the vehicle window interior shade assembly in accordance with a ninth embodiment of the present invention.

Referring now to FIG. 21, a modified first rollup 814 and a modified second rollup 815 in accordance with a ninth embodiment will now be explained. Specifically, the first and second rollups 814 and 815 replace the first and second rollups 14 and 15 of the first embodiment. In view of the similarity between the first and ninth embodiments, the description of the parts of the ninth embodiment that are identical to the parts of the first embodiment are omitted for the sake of brevity.

The first rollup 814 includes a trim member 820, and a first shade 816. The trim member 820 has a recess 860 defined by a pair of guide lips 866 and 868 similar to the trim member 20 of the first embodiment. A leading end portion 826 (a first leading edge portion) of the first shade 816 is bonded to an exterior surface of the trim member 820. Specifically, the leading end portion 826 wraps at least partway around the outer surface of the trim member 820 and is fixed thereto with an adhesive material.

The second rollup 815 includes a reinforcement member 822, and a second shade 818. Similarly, a leading end portion 828 of the second shade 818 wraps at least partway around the outer surface of the reinforcement member 822 and is fixed thereto with an adhesive or other similar bonding method or agent.

Tenth Embodiment

Figure 22:
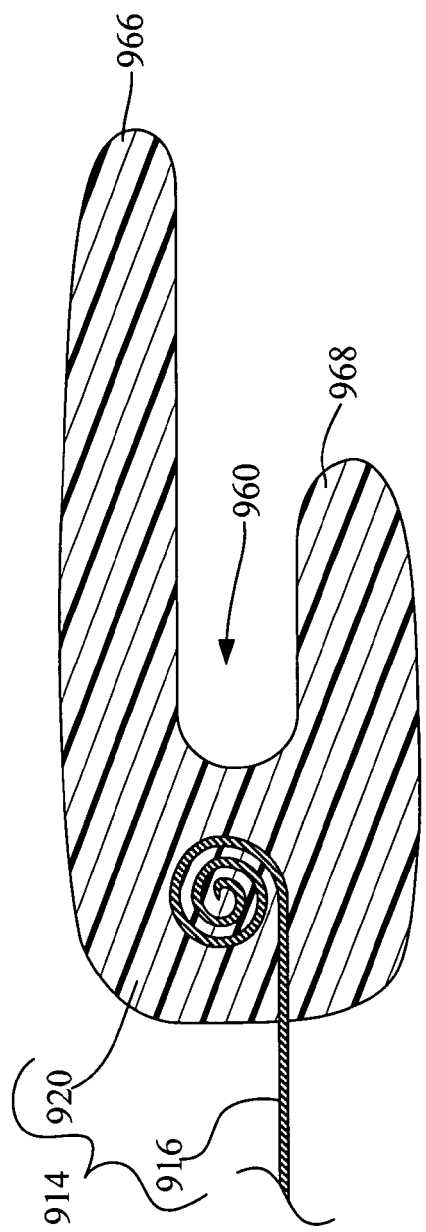
FIG. 22 is a side cross-sectional view of portions of a first trim member and first shade of the vehicle window interior shade assembly in accordance with a tenth embodiment of the present invention.

Referring now to FIG. 22, a modified first rollup 914 in accordance with a tenth embodiment will now be explained. The first rollup 914 replaces the first rollup 14 of the first embodiment. In view of the similarity between the first and tenth embodiments, the description of the parts of the tenth embodiment that are identical to the parts of the first embodiment are omitted for the sake of brevity.

The first rollup 914 includes a modified trim member 920 and a modified first shade 916. The trim member 920 has a recess 960 defined by a pair of guide lips 966 and 968 similar to the trim member 20 of the first embodiment. A leading end portion 926 of the first shade 916 is embedded within the trim member 920. For example, the trim member 920 can be molded from a polymer material that surrounds the leading end portion 926 of the first shade 916 during the forming process. Consequently, when the trim member 920 hardens, the leading end portion 926 of the first shade 916 is embedded within the trim member 920.

Eleventh Embodiment

Figure 23:
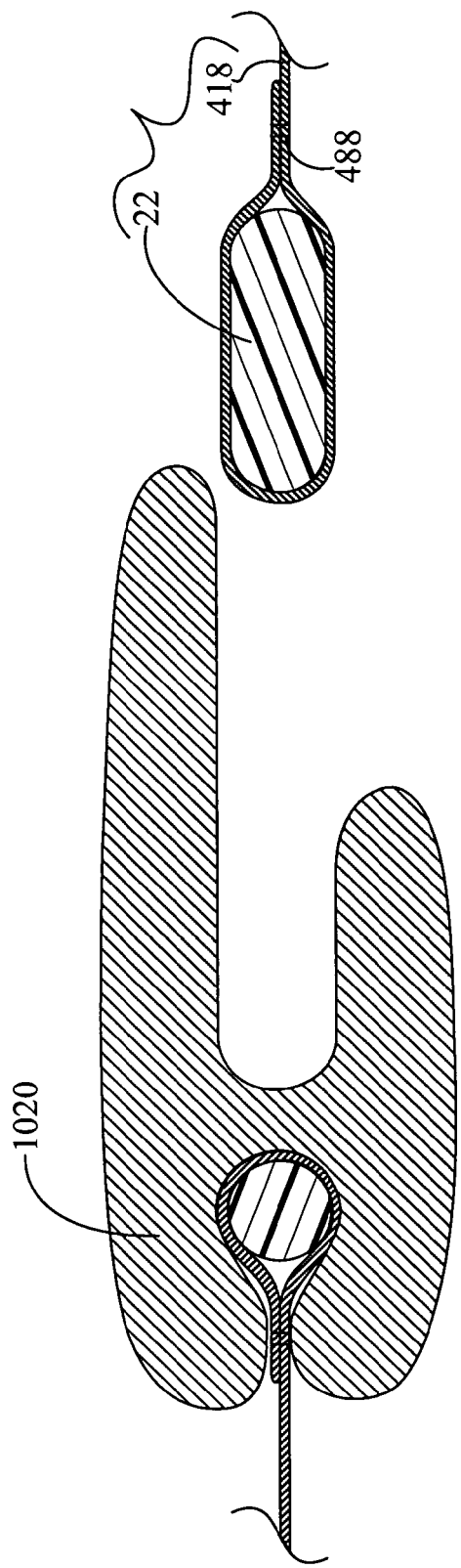
FIG. 23 is a side cross-sectional view of portions of first and second trim members and respective first and second shades of the vehicle window interior shade assembly in accordance with an eleventh embodiment of the present invention.

Referring now to FIGS. 23, a modified trim member 1020 having a modified first shade 1016 in accordance with an eleventh embodiment will now be explained. The trim member 1020 replaces the trim member 20 of the first embodiment. In view of the similarity between the first and eleventh embodiments, the description of the parts of the eleventh embodiment that are identical to the parts of the first embodiment are omitted for the sake of brevity.

As indicated in FIG. 23, the trim member 1020 is preferably made of a rigid material, such as metal. The reinforcement member 22 of the second shade 415 (as in the fifth embodiment in FIG. 17) is preferably formed of a soft pliable material relative to the trim member 1020. The reinforcement member 22 can be formed of, for instance, a flexible plastic or polymer material.

Twelfth Embodiment

Referring now to FIG. 24, a modified trim member 1120 having a modified support portion 1150, a modified guide portion 1152 and a modified attachment portion 1154 in accordance with a twelfth embodiment will now be explained. The trim member 1120 replaces the trim member 20 of the first embodiment or the trim member 320 of the fourth embodiment. In view of the similarity between the first and twelfth embodiments, description of the parts of the twelfth embodiment that are identical to the parts of the first embodiment are omitted for the sake of brevity.

The trim member 1120 includes the support portion 1150, a guide portion 1152 and an attachment portion 1154. The support portion 1150 is generally the same as in the support portion 50 of the first embodiment. The guide portion 1152 includes a first lip 66 and a second lip 1168. The first lip 66 is substantially the same as in the first embodiment. However, the second lip 1168 includes a diverging surface 1182 that diverges away from the first lip 66 in a direction extending away from a recess 1160. The diverging surface 1182 is generally the same as that on the second lip 168 of the second embodiment and assists in guiding the second rollup 415 (same as in the fifth embodiment) into the recess 60.

Also, the attachment portion 1154 of the trim member 1120 of the twelfth embodiment includes an attachment projection 1192 that is similar to the second attachment projection 92 in the seventh embodiment. The attachment projection 1192 is formed with a protruding lip 1194 that contacts a portion of the first shade 1116. However, the attachment projection 1154 is preferably made of the same material that the remainder of the trim member 1120.

Thirteenth Embodiment

Referring now to FIG. 25, a trim member 1220 in accordance with a thirteenth embodiment will now be explained. The trim member 1220 replaces the trim member 20 of the first embodiment or the trim member 320 of the fourth embodiment. In view of the similarity between the first and thirteenth embodiments, description of the parts of the thirteenth embodiment that are identical to the parts of the first embodiment are omitted for the sake of brevity.

The trim member 1220 includes a support portion 1250, an attachment portion 1254 and a guide portion 1252. The guide portion 1252 includes a first lip 1266 and a second lip 1268. The second lip 1268, the support portion 1250 and the attachment portion 1254 are all formed of a first material and the first lip 1266 is formed of a second material. The first material is preferably more rigid than the second material. Preferably, the first material is a metallic material and the second material is a flexible plastic, polymer or rubber material that compresses more easily than metal. One purpose of the first lip 1266 being made of a softer, more pliable or flexible material is to protect a passenger's fingers if they should be on the trim member 1220 when the shades are closing.

The various elements of the vehicle 10 are conventional components that are well known in the art. Since vehicles 10 are well known in the art, these structures will not be discussed or illustrated in detail herein. Rather, it will be apparent to those skilled in the art from this disclosure that the components can be any type of structure and/or programming that can be used to carry out the present invention.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle window interior shade assembly comprising:
   a vehicle shade support structure configured for installation adjacent to a window opening;
   a first shade movably coupled to the vehicle shade support structure to move between a retracted position and an extended position;
   a second shade movably coupled to the vehicle shade support structure to move between a retracted position and an extended position; and
   a trim member coupled to a first leading edge portion of the first shade, the trim member having an elongated recess that is configured to releasably receive a second leading edge portion of the second shade to form a continuous shade structure when the first and second shades are in both in the extended positions.

2. The vehicle window shade assembly as set forth in claim 1, wherein
   the trim member includes a guide lip adjacent to the recess and extending substantially parallel to the recess to guide the second leading edge portion of the second shade into the recess.

3. The vehicle window shade assembly as set forth in claim 2, wherein
   the trim member includes a support portion formed of a rigid material and the guide lip is formed of a soft pliable material relative to the support portion.

4. The vehicle window shade assembly as set forth in claim 1, wherein
   the trim member includes a support portion that extends at least a width of the first shade and is configured to provide rigidity to the trim member along the width of the first shade.

5. The vehicle window shade assembly as set forth in claim 4, wherein
   the trim member includes an attachment portion that is coupled to the first leading edge portion of the first shade, the attachment portion being formed of a rigid material and the support portion being formed of a soft pliable material relative to the attachment portion.

6. The vehicle window shade assembly as set forth in claim 1, wherein
   the trim member includes a pair of guide lips on opposite sides of the recess to guide the second leading edge portion of the second shade into the recess.

7. The vehicle window shade assembly as set forth in claim 6, wherein
   a first guide lip of the guide lips extends away from the first leading edge portion of the first shade a first distance, and
   a second guide lip of the guide lips extends away from the first leading edge portion of the first shade a second distance, the first distance being greater than the second distance.

8. The vehicle window shade assembly as set forth in claim 1, wherein
   the trim member includes an attachment groove with first the leading edge portion of the first shade being fixed within the attachment groove of the trim member.

9. The vehicle window shade assembly as set forth in claim 8, wherein
   the attachment groove of the trim member includes a cylindrically shaped portion that extends lengthwise through the trim member and a narrow slit that extends lengthwise through the trim member.

10. The vehicle window shade assembly as set forth in claim 9, wherein
    the trim member includes a retainer bar disposed in the cylindrically shaped portion of the attachment groove, with the leading edge portion of the first shade extending at least partially around the retainer bar.

11. The vehicle window shade assembly as set forth in claim 10, wherein
    the leading edge portion of the first shade is sewn to form a loop with the retainer bar disposed within the loop.

12. The vehicle window shade assembly as set forth in claim 1, wherein
    the trim member includes an attachment projection, with the leading edge portion of the first shade being fixedly attached to the attachment projection.

13. The vehicle window shade assembly as set forth in claim 12, wherein the first leading edge portion of the first shade is stapled to the attachment projection.

14. The vehicle window shade assembly as set forth in claim 12, wherein
the first leading edge portion of the first shade is sewn to the attachment projection.

15. The vehicle window shade assembly as set forth in claim 1, wherein
the first leading edge portion of the first shade is bonded to an exterior surface of the trim member.

16. The vehicle window shade assembly as set forth in claim 1, wherein
the first leading edge portion of the first shade is embedded within the trim member.

17. The vehicle window shade assembly as set forth in claim 1, wherein
the second leading edge portion of the second shade is coupled to a reinforcement member having a complementary mating configuration to mate with the recess of the trim member.

18. The vehicle window shade assembly as set forth in claim 17, wherein
the second leading edge portion of the second shade is bonded to the reinforcement member.

19. The vehicle window shade assembly as set forth in claim 17, wherein
the second leading edge portion of the second shade is sewn to form a loop with the reinforcement member disposed within the loop.

20. The vehicle window shade assembly as set forth in claim 17, wherein
the trim member includes a support portion formed of a rigid material and the reinforcement member is formed of a soft pliable material relative to the support portion.

21. The vehicle window shade assembly as set forth in claim 1, wherein
the trim member includes first and second attachment projections, the leading edge portion of the first shade being fixedly attached to the first attachment projection and the second attachment projection being formed with a protruding lip contacting a portion of the first shade.

22. The vehicle window shade assembly as set forth in claim 20, wherein
the first attachment projection is formed of a first material and the second attachment projection is formed of a second material, the second material being more flexible than the first material.

23. The vehicle window shade assembly as set forth in claim 1, wherein
the trim member includes a pair of guide lips adjacent to the recess, the guide lips having surfaces that diverge away from one another in a direction extending away from the recess.

* * * * *